(12) United States Patent
Ma et al.

(10) Patent No.: US 12,206,904 B2
(45) Date of Patent: Jan. 21, 2025

(54) FILTERING METHOD AND DEVICE, ENCODER AND COMPUTER STORAGE MEDIUM

(71) Applicant: GUANGDONG OPPO MOBILE TELECOMMUNICATIONS CORP., LTD., Guangdong (CN)

(72) Inventors: Yanzhuo Ma, Guangdong (CN); Shuai Wan, Guangdong (CN); Junyan Huo, Guangdong (CN); Wei Zhang, Guangdong (CN); Mingze Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 432 days.

(21) Appl. No.: 17/475,184

(22) Filed: Sep. 14, 2021

(65) Prior Publication Data

US 2022/0021905 A1  Jan. 20, 2022

Related U.S. Application Data

(63) Continuation of application No. PCT/CN2019/104499, filed on Sep. 5, 2019.

(60) Provisional application No. 62/822,951, filed on Mar. 24, 2019.

(51) Int. Cl.
*H04N 19/80* (2014.01)
*H04N 19/186* (2014.01)

(52) U.S. Cl.
CPC .......... *H04N 19/80* (2014.11); *H04N 19/186* (2014.11)

(58) Field of Classification Search
CPC .... H04N 19/176; H04N 19/70; H04N 19/105; H04N 19/107; H04N 19/117; H04N 19/159; H04N 19/463; H04N 19/503; H04N 19/587; H04N 19/593; G06N 3/045; G06N 3/08; G06N 3/084; G06N 3/04;
(Continued)

(56) References Cited

U.S. PATENT DOCUMENTS

| 10,019,814 B2 | 7/2018 | Kolesnikov |
| 2021/0150767 A1* | 5/2021 | Ikai ...................... H04N 19/159 |

FOREIGN PATENT DOCUMENTS

| CN | 108184129 A | 6/2018 |
| CN | 109120937 A | 1/2019 |
| CN | 109151475 A | 1/2019 |

(Continued)

OTHER PUBLICATIONS

International Search Report issued Nov. 26, 2019 of PCT/CN2019/104499 (4 pages).
(Continued)

*Primary Examiner* — Masum Billah
(74) *Attorney, Agent, or Firm* — Perkins Coie LLP

(57) ABSTRACT

Disclosed are a filtering method and device, an encoder and a computer storage medium. The method comprises: acquiring sample information to be filtered, acquiring at least one piece of side information, and inputting at least two components of the sample information to be filtered and at least one piece of side information into a filter based on a neural network so as to output at least one component after the sample information to be filtered is filtered. Further provided are a filtering device, an encoder and a computer storage medium.

10 Claims, 7 Drawing Sheets

(58) Field of Classification Search
CPC ........ G06N 3/044; G06N 3/048; G06N 20/00; G06N 3/063; G06N 3/047; G06N 3/088
USPC ........................................................ 375/240
See application file for complete search history.

(56) References Cited

FOREIGN PATENT DOCUMENTS

| | | | | |
|---|---|---|---|---|
| CN | 109151475 B | * | 3/2020 | ........... H04N 19/172 |
| EP | 3451670 A1 | | 3/2019 | |
| WO | 2019031410 A1 | | 2/2019 | |

OTHER PUBLICATIONS

Examination Report for Indian Application No. 202127046541 issued Mar. 28, 2022. 8 pages with English translation.
Extended European Search Report for European Application No. 19922221.7 issued May 2, 2022. 10 pages.
Hikvision "Convolutional Neural Network Filter (CNNF) for intra frame" Document: JVET-I0022; Jvet of ITU-T SB 16 WP 3 and ISO/IEC JTC 1/SC 29/WG 11; 9th Meeting: Gwangju, Korea; Jan. 20-26, 2018. 9 pages.
Kang, J. et al. "Multi-Modal/Multi-Scale Convolutional Neural Network Based In-Loop Filter Design for Next Generation Video Codec" IEEE ICIP, 2017, pp. 26-30.
MediaTek Inc. "AHG9: Convolutional neural network loop filter" Document: JVET-M0159-v1; JVET of ITU-T SG 16 WP 3 and ISO/IEC JTC 1/SC 29/WG 11; 13th Meeting: Marrakech, MA; Jan. 9-18, 2019. 6 pages.
Examination Report of the ID application No. P00202008547, issued on Oct. 12, 2023. 7 pages with English translation.
Shuai Wan etc., CE13-related: Integrated in-loop filter based on CNN, JVET of ITU-T SG 16 WP3 and ISO/IEC JTC 1/SC 29/WG 11 14th Meeting: Geneva, CH, Mar. 19-27, 2019. 9 pages.
Notice of Reasons for Refusal of the JP application No. 2021-556289, issued on Nov. 7, 2023. 10 pages with English translation.
Decision of Rejection of the Japanese application No. 2021-556289, issued on Jun. 4, 2024. 5 pages with English translation.
Optimized Non-Local In-Loop Filter for Video Coding, Meng, Xuewei et al., United States, IEEE, Jan. 6, 2018, pp. 233 to 237, [online]. 8 pages.

* cited by examiner

FILTERING METHOD AND DEVICE, ENCODER AND COMPUTER STORAGE MEDIUM

CROSS-REFERENCE TO RELATED APPLICATION

This application is a continuation application of International Application No. PCT/CN2019/104499 filed on Sep. 5, 2019, which claims priority to U.S. Provisional Application No. 62/822,951, filed of Mar. 24, 2019. The contents of the above-identified applications are hereby incorporated by reference.

TECHNICAL FIELD

Implementations of the present disclosure relate to the field of video picture processing technology, and more particularly, to a filtering method, a filtering device, an encoder and a computer storage medium.

BACKGROUND

In video encoding and decoding systems, a block Coding Unit (CU)-based hybrid coding framework is used for most video coding. Due to use of different coding parameters for neighbouring CUs, such as different transform processes, different Quantization Parameters (QPs), different prediction methods, different reference picture frames etc., sizes of errors introduced in various CUs and mutual independence of distribution characteristics of the errors, and discontinuity of a boundary between the neighbouring CUs, block effect is generated, thereby subjective and objective quality of a reconstructed picture is affected and even prediction accuracy of subsequent encoding and decoding is affected.

Thus, in an encoding and decoding process, a pre-processing filter is used to pre-process an original picture for decreasing resolution of a video. Since the resolution of the video needs to be coded is lower than resolution of an original video, fewer bits may be used for representation, which can improve an overall coding efficiency. A post filter is used to process an in-loop filtered video to output a video for improving resolution of the in-loop filtered video. For the pre-processing filter and the post filter, a neural network-based filter is often composed of multiple basic units currently, an input of a neural network is a single input or multiple inputs, that is, an input can be a single type of colour component of a picture or multiple types of colour components of a picture, i.e., an existing Convolutional Neural Network (CNN) has high complexity, and a current CNN filter does not make full use of relevant information, thereby improvement of quality of a reconstructed picture is limited.

SUMMARY

Implementations of the present disclosure provide a filtering method, a filtering device, an encoder, a decoder and a computer storage medium.

Technical schemes of the implementations of the present disclosure may be implemented as follows.

In a first aspect, an implementation of the present disclosure provides a filtering method including: acquiring sample information to be filtered; acquiring at least one type of side information; and inputting at least two components of the sample information to be filtered and the at least one type of side information into a neural network-based filter to output and obtain at least one component after the sample information to be filtered is filtered.

In a second aspect, an implementation of the present disclosure provides a filtering device including: a first acquisition module configured to acquire sample information to be filtered; a second acquisition module configured to acquire at least one type of side information; and a determination module configured to input at least two components of the sample information to be filtered and the at least one type of side information into a neural network-based filter to output and obtain at least one component after the sample information to be filtered is filtered.

In a third aspect, an implementation of the present disclosure provides an encoder including: a processor and a storage medium storing instructions executable by the processor, wherein the storage medium relies on the processor to perform an operation through a communication bus, and when the instructions are executed by the processor, the filtering method provided in one or more implementations described above is performed.

In a fourth aspect, an implementation of the present disclosure provides a computer storage medium storing executable instructions, wherein when the executable instructions are executed by one or more processors, the one or more processors perform the filtering method provided in one or more implementations described above.

DETAILED DESCRIPTION

In order to understand features and technical contents of implementations of the present disclosure in more detail, implementations of the implementations of the present disclosure will be described in detail below in combination with the accompanying drawings, which are for reference only and are not intended to limit the implementations of the present disclosure.

In a video encoding and decoding system, a video to be encoded includes original video frames, which includes an original picture. The original picture is processed in various manners, such as prediction, transform, quantization, reconstruction, and filtering. In these processing processes, the processed video picture may have shifted in sample value relative to the original picture, resulting in visual obstacles or artifacts. In addition, under a block Coding Unit (CU)-based hybrid coding framework used by most video encoding and decoding systems, due to use of different encoding parameters (such as different transform processes, different QPs, different prediction methods, and different reference picture frames) for neighbouring coding blocks, sizes of errors introduced in various coding blocks and mutual independence of distribution characteristics of the errors, and discontinuity of a boundary between the neighbouring coding blocks, block effect is generated. Such distortions affect subjective and objective quality of reconstructed picture blocks adversely. If the reconstructed picture blocks are used as a reference picture of subsequent coding samples, the distortions will even affect prediction accuracy of subsequent encoding and decoding adversely, and further affect sizes of bits in video bitstream. Therefore, a pre-processing filter and a post filter are often added to a video encoding and decoding system to improve subjective and objective quality of a reconstructed picture.

Figure 1:
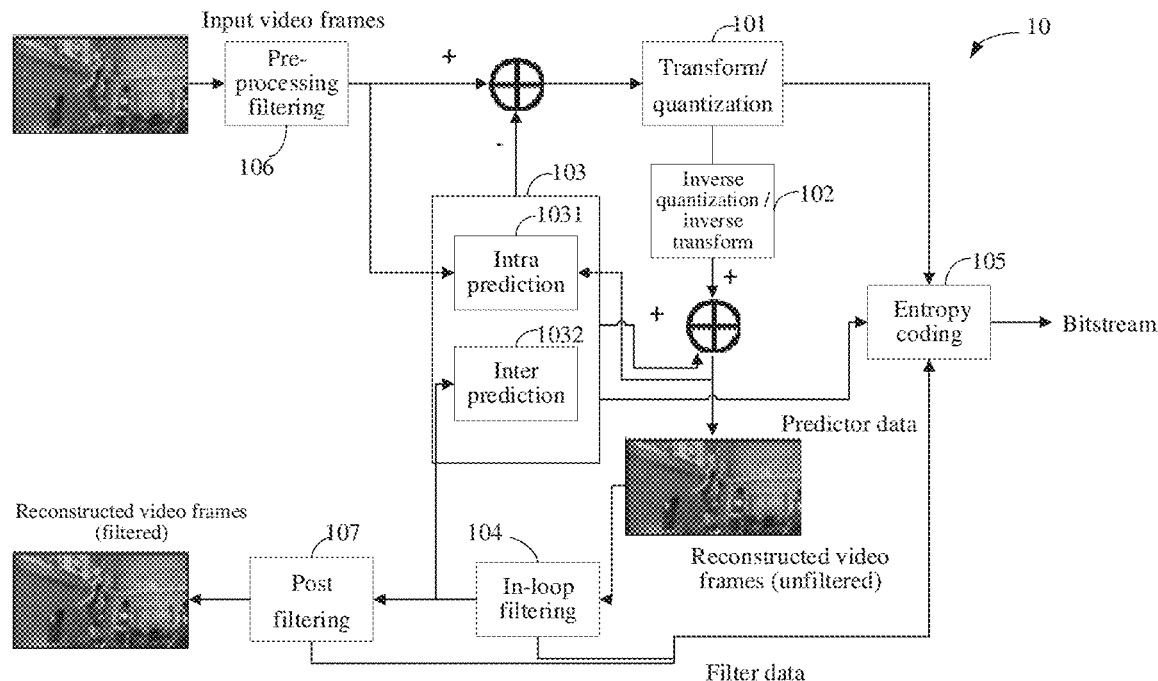
FIG. 1 is a schematic diagram of a structure of a traditional encoding block diagram.

FIG. 1 is a schematic diagram of a structure of a traditional encoding block diagram. As shown in FIG. 1, the traditional encoding block diagram 10 may include components such as a transform and quantization unit 101, an inverse transform and inverse quantization unit 102, a prediction unit 103, an in-loop filtering unit 104, and an entropy coding unit 105. The prediction unit 103 further includes an intra prediction unit 1031 and an inter prediction unit 1032. A Coding Tree Unit (CTU) may be obtained by performing preliminary partitioning on an input original picture, and a CU may be obtained by further performing content adaptive partitioning on the CTU, the CU generally containing one or more Coding Blocks (CBs). Residual information may be obtained by performing intra prediction on a coding block by the intra prediction unit 1031 or inter prediction on a coding block by the inter prediction unit 1032. The residual information is passed through the transform and quantization unit 101 to transform the coding block, including transforming the residual information from a sample domain to a transform domain and quantizing obtained transform coefficients to further reduce a bit rate. After determining a prediction mode, the prediction unit 103 is further used to provide selected intra prediction data or inter prediction data to the entropy coding unit 105. In addition, the inverse transform and inverse quantization unit 102 is used for reconstructing the coding block, a residual block is reconstructed in the sample domain, the reconstructed residual block is passed through the in-loop filtering unit 104 to remove block artifacts, and then the reconstructed residual block is added to a decoded picture buffer unit to generate a reconstructed reference picture. The entropy coding unit 105 is used for encoding various coding parameters and quantized transform coefficients. For example, the entropy coding unit 105 may use header information coding and Context-based Adaptive Binary Arithmetic Coding (CABAC) algorithms to encode coding information indicating the determined prediction mode, to output corresponding bitstream.

For the traditional encoding block diagram 10 in FIG. 1, the in-loop filtering unit 104 is a loop filter, which is also referred to as an in-loop filter; it may include a De-Blocking Filter (DBF), a Sample Adaptive Offset (SAO) filter, and an Adaptive Loop Filter (ALF).

For the traditional encoder diagram 10 in FIG. 1, a pre-processing filtering unit 106 is used to receive input original video frames and perform pre-processing filtering on an original picture frame in the original video frames to reduce video resolution. A post filtering unit 107 is used to receive in-loop filtered video frames and perform post filtering on the in-loop filtered video frames to improve video resolution. Thus, reconstructed video frames may be obtained with fewer bits in a video encoding and decoding process, so as to improve the overall encoding and decoding efficiency. However, at present, an input to a neural network used by both a pre-processing filter and a post filter is a single input or multiple inputs, that is, a single colour component or multiple colour components when input, i.e., an existing CNN has high complexity, and a current CNN filter does not make full use of relevant information, thereby improvement of quality of a reconstructed picture is limited.

Figure 2:
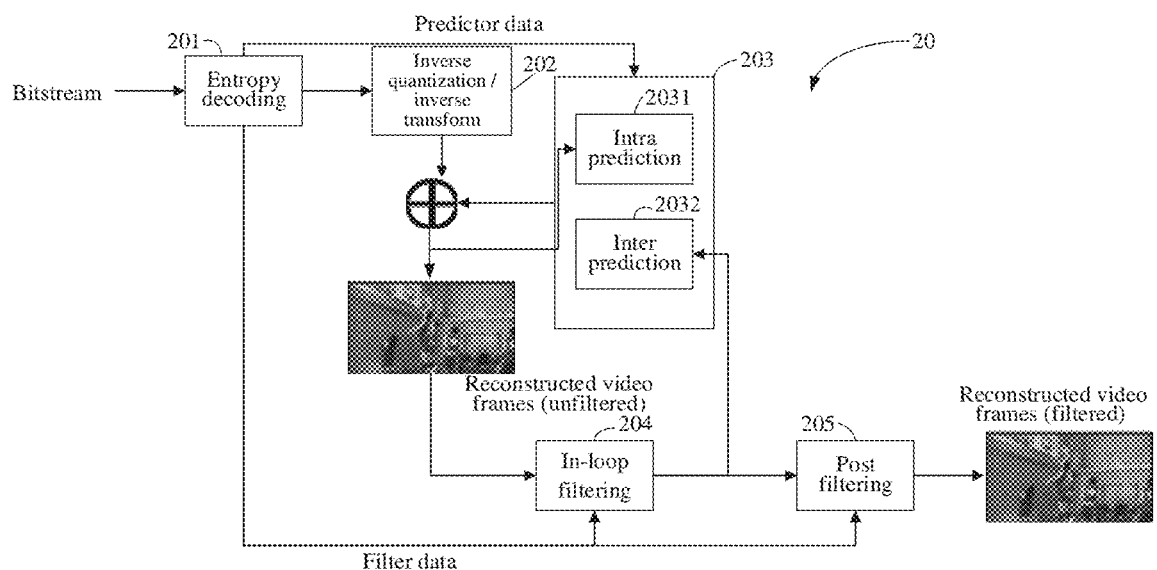
FIG. 2 is a schematic diagram of a structure of a traditional decoding block diagram.

Similar to the encoding block diagram in FIG. 1, FIG. 2 is a schematic diagram of a structure of a decoding block diagram. As shown in FIG. 2, the traditional decoding block diagram 20 may include components such as an entropy decoding unit 201, an inverse quantization and inverse transform unit 202, a prediction unit 203, an in-loop filtering unit 204, and a post filtering unit 205. The prediction unit 203 further includes an intra prediction unit 2031 and an inter prediction unit 2032. Herein, it should be noted that a video decoding process is a process opposite or inverse to a video encoding process. A post-processing filtered picture obtained is determined as reconstructed video frames in the video decoding process. It can be seen from FIG. 2 that a pre-processing filtering unit in an encoding process is not involved in a decoding process.

An implementation of the present disclosure provides a filtering method, which is applied to a filtering device. The filtering device can be arranged in a pre-processing filter and a post filter in an encoder, or in a post filter in a decoder, which is not specifically limited in the implementations of the present disclosure.

Figures 3, 4:
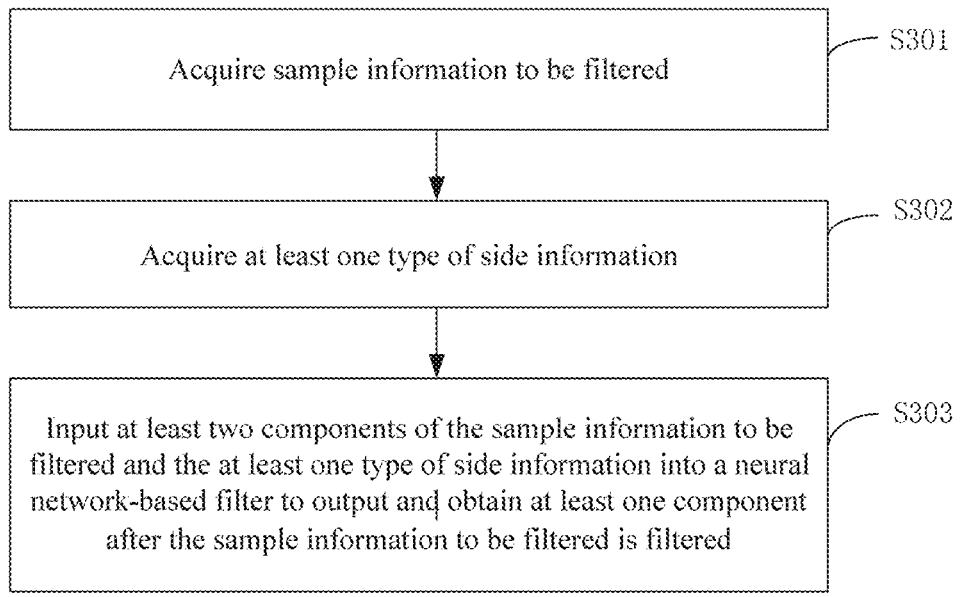
FIG. 3 is a schematic flow chart of an optional filtering method provided in an implementation of the present disclosure.
FIG. 4 is a schematic diagram of a structure of a block partitioning matrix provided in an implementation of the present disclosure.

FIG. 3 is a schematic flow chart of an optional filtering method provided in an implementation of the present disclosure. As shown in FIG. 3, the filtering method may include the follow steps.

In S301, sample information to be filtered is acquired.

In S302, at least one type of side information is acquired.

In S303, at least two components of the sample information to be filtered and the at least one type of side information are input into a neural network-based filter to output and obtain at least one component after the sample information to be filtered is filtered.

The sample information to be filtered refers to a picture block to be filtered represented by sample values, and the picture block to be filtered includes three colour components, wherein the at least two components may be any two or three of the three colour components, and the colour components may include a first colour component, a second colour component, and a third colour component. The implementation of the present disclosure will be described by taking a luma component represented by the first colour component, a first chroma component represented by the second colour component, and a second chroma component represented by the third colour component as an example.

The at least one type of side information may be at least one of side information corresponding to the first colour component, side information corresponding to the second colour component, and side information corresponding to the third colour component.

It should be noted that the original picture frame may be divided into CTUs, or the CTUs may be divided into CUs. That is to say, block partitioning information in the implementation of the present disclosure may refer to CTU partitioning information or CU partitioning information. Thus, the filtering method provided in the implementation of the present disclosure may be applied not only to pre-processing filtering or post filtering at a CU level, but also to pre-processing filtering or post filtering at a CTU level, which is not specifically limited in the implementations of the present disclosure.

The sample information to be filtered is an original picture block in a video to be encoded represented by sample values, or the sample information to be filtered is a picture block obtained by an in-loop filtering process of a video to be encoded represented by sample values in a video encoding process.

It should be noted that in a process of performing video encoding on an original picture in a video to be encoded, when performing video encoding processing on the original picture, CU partitioning, prediction, transform, and quantization processing are performed on the original picture, and in order to obtain a reference picture used for video encoding of subsequent pictures to be encoded, inverse transform and inverse quantization, reconstruction, and filtering processing may also be performed. That is to say, the sample information to be filtered may be a picture block in an original picture just input into an encoder, and this is a case when applied to a pre-processing filter. The sample information to be filtered may be a picture block just obtained after in-loop filtering processing, and this is a case when applied to a post filter. In this way, the sample information to be filtered is obtained.

That is to say, after sample information to be filtered is acquired, at least two components of the sample information to be filtered and at least one type of side information may be acquired.

It should be noted that in a video picture, a first colour component, a second colour component, and a third colour component are generally used to characterize an original picture or a picture to be filtered. Under a luma-chroma component representation method, these three colour components are a luma component, a blue chroma (chromatism) component, and a red chroma (chromatism) component respectively. Specifically, the luma component is usually represented by a symbol Y, the blue chroma component is usually represented by a symbol Cb or U, and the red chroma component is usually represented by a symbol Cr or V.

In the implementation of the present disclosure, at least one component represents one or more of a first colour component, a second colour component, and a third colour component. At least two components may be a first colour component, a second colour component, and a third colour component, or at least two components may be a first colour component and a second colour component, or at least two components may be a first colour component and a third colour component, or at least two components may even be a second colour component and a third colour component, which is not specifically limited in the implementations of the present disclosure.

In a next Versatile Video Coding (VVC) standard, a corresponding test model is a VVC Test Model (VTM). When a VTM is implemented for test, YUV used in a current standard test sequence is in a format of 4:2:0. Each picture frame in a video to be encoded in this format may be composed of three components: a luma component Y and two chroma components U and V. Assuming that in the video to be encoded, a height of an original picture is H and a width of the original picture is W, then size information corresponding to a first colour component is H×W, and size information corresponding to a second colour component or a third colour component is $$\frac{H}{2} \times \frac{W}{2}.$$

It should be noted that the implementation of the present disclosure will be described by taking YUV of a format of 4:2:0 as an example, but the filtering method provided in the implementation of the present disclosure is also applicable to other sampling formats.

Taking YUV of a format of 4:2:0 as an example, since size information of a first colour component is different from that of a second colour component or a third colour component, in order to input the first colour component and/or the second colour component and/or the third colour component into a neural network-based filter at one time, the three components need to be sampled or recombined such that size information in a spatial domain of the three components is the same.

In some implementations, a sample rearrangement processing (which may also be called a down-sampling processing) may be performed on a colour component with high resolution such that size information in a spatial domain of the three components is the same. Specifically, before S302, a colour component with high resolution may be selected for the at least two components of the sample information to be filtered, and a sample rearrangement processing may be performed on the colour component with high resolution.

It should be noted that three components contained in an original picture are original colour components before other processing. If a first colour component is a luma component, a second colour component is a first chroma component and a third colour component is a second chroma component, then a colour component with high resolution is the first colour component, at this time, it is necessary to perform a sample rearrangement processing on the first colour component.

Illustratively, taking an original picture with a size of 2×2 as an example, it is converted into 4 channels, that is, a tensor of 2×2×1 is arranged into a tensor of 1×1×4. Then when size information of a first colour component of the original picture is H×W, it may be converted into a form of $$\frac{H}{2} \times \frac{W}{2} \times 4$$

by a sample rearrangement processing before filtering. Since size information of a second colour component and size information of a third colour component is both $$\frac{H}{2} \times \frac{W}{2},$$

size information in a spatial domain of the three colour components may be the same. Subsequently the three colour components after the sample rearrangement processing are merged and are transformed into a form of $$\frac{H}{2} \times \frac{W}{2} \times 6,$$

and input to a pre-processing filter or a post filter.

In some implementations, an up-sampling processing may be performed on a colour component with low resolution such that size information in a spatial domain of the three components is the same. Specifically, a component with low resolution may be selected for the at least two components of the sample information to be filtered, and the component with low resolution may be up-sampled.

It should be noted that besides that a sample rearrangement processing (i.e., downward adjustment) of size information may be performed on a component with high resolution, in the implementation of the present disclosure, an up-sampling processing (i.e., upward adjustment) may also be performed on a component with low resolution. In addition, for a component with low resolution, not only an up-sampling processing, but also a de-convolution processing, or even a super-resolution processing may be performed, and these three types of processing have the same effect, which is not specifically limited in the implementations of the present disclosure.

It should also be noted that three components contained in an original picture are original colour components before other processing. If a first colour component is a luma component, a second colour component is a first chroma component and a third colour component is a second chroma component, then a colour component with low resolution is the second colour component or the third colour component, at this time, it is necessary to perform an up-sampling processing on the second colour component or the third colour component.

Illustratively, when size information of a second colour component of an original picture and size information of a third colour component of the original picture is both $$\frac{H}{2} \times \frac{W}{2},$$

it may be converted into a form of H×W by performing an up-sampling processing before filtering. Since size information of a first colour component is H×W, this may also make size information in a spatial domain of the three colour components the same, and resolution of the second colour component after the up-sampling processing and resolution of the third colour component after the up-sampling processing will be consistent with resolution of the first colour component.

Side information may be used to assist in filtering and improve quality of filtering. The side information may be not only block partitioning information (such as CU partitioning information and/or CTU partitioning information), but also quantization parameter information, or even Motion Vector (MV) information, prediction direction information, etc. Such information may be used alone as side information or arbitrarily combined as side information. For example, block partitioning information alone is used as side information, or block partitioning information and quantization parameter information is jointly used as side information, or block partitioning information and MV information is jointly used as the side information, which is not specifically limited in the implementations of the present disclosure.

Then, after at least two components of the sample information to be filtered and at least one type of side information are acquired, the at least two components and the at least one type of side information are input into a neural network-based filter for processing. Herein, processing methods such as component processing, fusing processing, joint processing, and splitting processing, may be included, which is not specifically limited in the implementations of the present disclosure.

So far, the acquired at least two components of the sample information to be filtered and the acquired at least one type of side information are input as input values into the neural network-based filter, so that at least one component after the sample information to be filtered is filtered may be output and obtained.

At least one joint processing stage and one separate processing stage are included in a structure of neural network. In the joint processing stage, all components are processed jointly. In the separate processing stage, each component is processed on a separate branch of the neural network.

In order to obtain at least one component after the sample information to be filtered is filtered, in an optional implementation, S303 may include the following steps.

In S3031, each of the at least two components is processed respectively to obtain at least two processed components.

In S3032: a fusing processing is performed according to the at least one type of side information and the at least two processed components, and fusing information of the sample information to be filtered is obtained.

In S3033, the fusing information is processed to obtain at least one component after the sample information to be filtered is filtered.

In S3031, the processing process may be regarded as a splitting stage used for obtaining at least two components respectively. The fusing information at least includes information obtained by fusing at least two components. In S3032, the processing process may be regarded as a merging stage for fusing at least two components. Thus, in the implementation of the present disclosure, a cascaded processing structure is used, and by performing a fusing processing on various components input, not only a relationship between various components is fully utilized, but also a problem that multiple complete network forward calculations need to be performed on the at least two components is avoided effectively, thereby reducing computational complexity and saving code rate of encoding. Finally, fusing information is processed to obtain at least one component after the sample information to be filtered is filtered. Thus, the fusing information may further assist in filtering, and improve subjective and objective quality of a reconstructed picture of a video in an encoding and decoding process.

In order to obtain the at least two processed components, in an optional implementation, S3031 may include: a component processing is performed on each of the at least two components respectively to obtain the at least two processed components.

Herein, original colour components YUV of an original picture block are acquired, and Y, U, and V are processed respectively to obtain YUV of a picture block to be filtered, that is, at least two components of the picture block to be filtered may be YU, YV, or UV.

In order to obtain at least two processed components, in an optional implementation, when first side information corresponding to each component is acquired, accordingly, S3031 may include: respectively performing a fusing processing on each component of at least two components with the first side information corresponding to each component to obtain the at least two processed components, wherein the first side information at least includes block partitioning information and/or quantization parameter information.

It may be understood that first side information may be used to assist in filtering and improve quality of filtering. The first side information may be not only block partitioning information (such as CU partitioning information and/or CTU partitioning information), but also quantization parameter information, or even Motion Vector (MV) information, prediction direction information, etc. Such information may be used alone as first side information, or may be arbitrarily combined as first side information. For example, block partitioning information alone may be used as first side information, or block partitioning information and quantization parameter information are jointly used as first side information, or block partitioning information and MV information are jointly used as first side information, which is not specifically limited in the implementations of the present disclosure.

It should be noted that S3031 may be regarded as a first splitting stage. Thus, at least two components of sample information to be filtered may be processed (such as deep learning) respectively, to obtain at least two processed components. In addition, first side information corresponding to each component may also be added to a corresponding component to obtain at least two processed components. That is to say, for the first splitting stage, first side information may or may not be fused, which is not specifically limited in the implementations of the present disclosure.

Further, in some implementations, CU partitioning information may be used as block partitioning information corresponding to each component of sample information to be filtered. For CU partitioning information, a first value is filled in each sample point position corresponding to a CU boundary and a second value is filled in other sample point positions to obtain a first matrix corresponding to the CU partitioning information, wherein the first value is different from the second value; and the first matrix herein is used as block partitioning information corresponding to each component of sample information to be filtered.

It should be noted that a first value may be a preset value, letter, etc. A second value may also be a preset value, letter, etc., as long as the first value is different from the second value. For example, the first value may be set to 2 and the second value may be set to 1, which is not specifically limited in the implementations of the present disclosure.

In the implementation of the present disclosure, CU partitioning information may be used as first side information to assist in filtering of sample information to be filtered. That is to say, in a process of video encoding of an original picture in a video to be encoded, CU partitioning information may be fully utilized to guide filtering after the CU partitioning information is fused with at least two components of sample information to be filtered.

Specifically, CU partitioning information is converted into a Coding Unit Map (CUmap), which is represented by a two-dimensional matrix, i.e., a CUmap matrix, that is, a first matrix in the implementation of the present disclosure. That is to say, taking a first colour component of an original picture as an example, it may be divided into a plurality of CUs. A first value is filled in each sample point position corresponding to each CU boundary, while a second value is filled in other sample point positions, thus a first matrix reflecting CU partitioning information may be constructed. Illustratively, referring to FIG. 4, it shows a schematic diagram of a structure of a block partitioning matrix provided in an implementation of the present disclosure. As shown in FIG. 4, if this figure represents a CTU, the CTU may be divided into 9 CUs. Assuming that a first value is set to 2 and a second value is set to 1. Thus, 2 is filled in each sample point position corresponding to each CU boundary, while 1 is filled in other sample point positions. That is to say, sample point positions filled with 2 represent CU boundaries, so as to determine CU partitioning information, that is, first side information corresponding to a first colour component of sample information to be filtered.

It should also be noted that if a first colour component is a luma component and both a second colour component and a third colour component are chroma components, CU partitioning information of the first colour component may be different from that of the second colour component or the third colour component. Therefore, when CU partitioning information of the first colour component is different from that of the second colour component or the third colour component, the CU partitioning information corresponding to the first colour component of sample information to be filtered and the CU partitioning information corresponding to the second colour component or the third colour component of the sample information to be filtered need to be determined respectively; then CU partitioning information, as first side information, is fused into the corresponding first colour component, second colour component, or third colour component. When CU partitioning information of the first colour component is the same as that of the second colour component or the third colour component, only CU partitioning information of the first or second or third colour component may be determined at this time, and then the determined CU partitioning information, as first side information, may be fused into the corresponding first or second or third colour component. Thus, it is convenient to subsequently fuse at least two new components to preform pre-processing filtering or post filtering on the sample information to be filtered.

In some implementations, determining respectively first side information corresponding to each component may be obtaining respectively quantization parameter corresponding to each component of at least two components of an original picture block based on an original picture in a video to be encoded, and using the quantization parameter as quantization parameter information corresponding to each component of sample information to be filtered.

Further, in some implementations, using the quantization parameter as the quantization parameter information corresponding to each component of the sample information to be filtered may be respectively establishing a second matrix with the same size as each component of the original picture, wherein a normalized value of a quantization parameter corresponding to each component of the original picture is filled in each sample point position in the second matrix; and the second matrix is used as the quantization parameter information corresponding to each component of the sample information to be filtered.

It should be noted that distortion degrees of sample information to be filtered corresponding to different quantization parameters are different. If quantization parameter information is fused, a filtering network can adaptively have a capability to process any quantization parameter during a training process.

In the implementation of the present disclosure, quantization parameter information may also be used as first side information to assist in filtering of a picture block to be filtered. That is to say, in a process of video encoding of an original picture in a video to be encoded, quantization parameter information may be fully utilized to guide filtering after the quantization parameter information is fused with the at least two components of sample information to be filtered. The quantization parameter information may be normalized or non-normalized (such as classification processing, interval partitioning processing). A normalization processing of a quantization parameter will be described in detail below by way of example.

Specifically, quantization parameter information is converted into a second matrix reflecting the quantization parameter information. That is to say, taking a first colour component of an original picture as an example, a matrix with the same size as the first colour component of the original picture is established. A normalized value of a quantization parameter corresponding to the first colour component of the original picture is filled in each sample point position in the matrix. The normalized value of the quantization parameter is represented by $QP_{max}(x, y)$, i.e.:

$$QP_{max}(x, y) = \frac{QP}{QP_{max}}, \quad (1)$$

$$x = 0, 1, \ldots, H-1; y = 0, 1, \ldots, W-1$$

In formula (1), QP represents a quantization parameter value corresponding to the first colour component of the original picture, x represents an abscissa value of each sample point position in the first colour component of the original picture, and y represents an ordinate value of each sample point position in the first colour component of the original picture; $QP_{max}$ represents the maximum value of the quantization parameter. Generally speaking, a value of $QP_{max}$ is 51, but $QP_{max}$ may be another value, such as 29, 31, which is not specifically limited in the implementations of the present disclosure.

In order to obtain at least two processed components, in an optional implementation, when second side information corresponding to each component is obtained, accordingly, S3031 may include: performing a fusing processing on each component of at least two components with second side information corresponding to each component to obtain at least two processed components, wherein the second side information is different from first side information.

In order to obtain fusing information of sample information to be filtered, in an optional implementation, S3032 may include: performing a fusing processing on at least two processed components with first side information corresponding to each component to obtain fusing information of sample information to be filtered.

In order to obtain fusing information of the sample information to be filtered, in an optional implementation, S3032 may include: performing a fusing processing on at least two processed components with second side information corresponding to each component to obtain fusing information of sample information to be filtered.

It should be noted that no matter first side information or second side information, they all may be used to assist in filtering and improve quality of filtering. The first side information and the second side information may be one or more of block partitioning information, quantization parameter information, MV information, prediction direction information, etc. That is, when first side information is block partitioning information, second side information may be quantization parameter information; or when first side information is quantization parameter information, second side information may be block partitioning information; or when first side information is block partitioning information and quantization parameter information, second side information may be MV information; or when first side information is block partitioning information, second side information may be quantization parameter information and MV information, which is not specifically limited in the implementations of the present disclosure.

It should also be noted that a fusing stage of first side information may be the same as or different from a fusing stage of second side information. Assuming that a first splitting stage is used to represent processing stages in which at least two components of sample information to be filtered are obtained respectively, a merging stage is used to represent a processing stage in which fusing information of sample information to be filtered is determined, and a second splitting stage is used to represent processing stages in which residual information of each component is determined respectively after a fusing processing. Thus, a fusing stage of first side information may be any one of a first splitting stage, a merging stage, or a second splitting stage, and a fusing stage of second side information may be any one of a first splitting stage, a merging stage, or a second splitting stage. That is to say, a fusing stage of first side information may be a first splitting stage, and a fusing stage of second side information may be a merging stage; or a fusing stage of first side information may be a merging stage, and a fusing stage of second side information may be a first splitting stage; or a fusing stage of first side information may be a second splitting stage, and a fusing stage of second side information may be a merging stage; or a fusing stage of first side information may be a first splitting stage, and a fusing stage of second side information may be a second splitting stage; or a fusing stage of first side information may be a first splitting stage, and a fusing stage of second side information may also be a first splitting stage; or a fusing stage of first side information may be a merging stage, and a fusing stage of second side information may also be a merging stage, which is not specifically limited in the implementations of the present disclosure.

In order to obtain at least one component after sample information to be filtered is filtered, in an optional implementation, S3033 may include: performing joint processing and splitting processing on fusing information to obtain residual information corresponding to at least one of the at least two components; and calculating a sum of the at least one of the at least two components and the residual information corresponding to the at least one component to obtain at least one component after the sample information to be filtered is filtered.

It should be noted that the pre-processing filtering or post filtering in the implementations of the present disclosure uses a multistage cascaded processing structure, such as a splitting-merging-splitting processing structure, a splitting-merging processing structure, or a merging-splitting processing structure, which is not specifically limited in the implementations of the present disclosure.

Specifically, if at least two components of sample information to be filtered need to be obtained respectively at first, this process is a first splitting stage; and then the at least two components are fused, this process is a merging stage; thus, after all information is fused, when multiple components, such as a first colour component, a second colour component, and a third colour component, need to be output at the same time, at this time filtered first colour component of sample information to be filtered, filtered second colour component of sample information to be filtered and filtered third colour component of sample information to be filtered are obtained respectively by performing joint processing on fusing information, acquiring residual information corresponding to the first colour component, residual information corresponding to the second colour component, and residual information corresponding to the third colour component respectively, and then calculating a sum of the first colour component and the residual information corresponding to the first colour component, a sum of the second colour component and the residual information corresponding to the second colour component, and a sum of the third colour component and the residual information corresponding to the third colour component, and this process is a second splitting stage. Then a splitting-merging-splitting processing structure is used in the whole pre-processing filtering or post filtering process.

If at least two components of the sample information to be filtered need to be acquired first, this process is a first splitting stage; and then the at least two components are fused, this process is a merging stage; thus, after all information is fused, when only one component, such as a first colour component, needs to be output, at this time residual information corresponding to the first colour component is obtained by performing joint processing on fusing information, and then a sum of the first colour component and the residual information corresponding to the first colour component is calculated to obtain a first colour component after the sample information to be filtered is filtered, and there is no second splitting stage in this process. Then a splitting-merging processing structure is used in the whole pre-processing filtering or post filtering process.

In addition, if it is not necessary to obtain at least two components of sample information to be filtered respectively, that is, a first splitting stage is not needed, and the at least two components of the sample information to be filtered may be fused directly, that is, a merging stage is directly entered; while after all information is fused, since multiple components need to be output at the same time, a second splitting stage is still needed at this time. Then a merging-splitting processing structure is used in the whole pre-processing filtering or post filtering process.

It should also be noted that the pre-processing filtering or post filtering in the implementations of the present disclosure may use more cascaded processing structures, such as a splitting-merging-splitting-merging-splitting processing structure. For such cascaded processing structures, in the implementations of the present disclosure, a typical cascaded structure, such as a splitting-merging-splitting processing structure, may be used, or a cascaded processing structure with fewer cascade structures than a typical cascaded structure, such as a splitting-merging processing structure or a merging-splitting processing structure, may be used, or even a cascaded processing structure with more cascade structures than a typical cascaded structure, such as a splitting-merging-splitting-merging-splitting processing structure, may be used, which is not specifically limited in the implementation of the present disclosure.

A pre-processing filter or a post filter may include a convolutional neural network filter. It should be noted that a pre-processing filter or a post filter may be a convolutional neural network filter, or a filter established by other deep learning, which is not specifically limited in the implementations of the present disclosure. Herein, a convolution neural network filter, also called a CNN filter, is a feed-forward neural network containing convolution calculations and having a depth structure, and is one of representative algorithms of deep learning. An input layer of the CNN filter may process multidimensional data, such as three colour component (Y/U/V) channels of an original picture in a video to be encoded.

Figure 5:
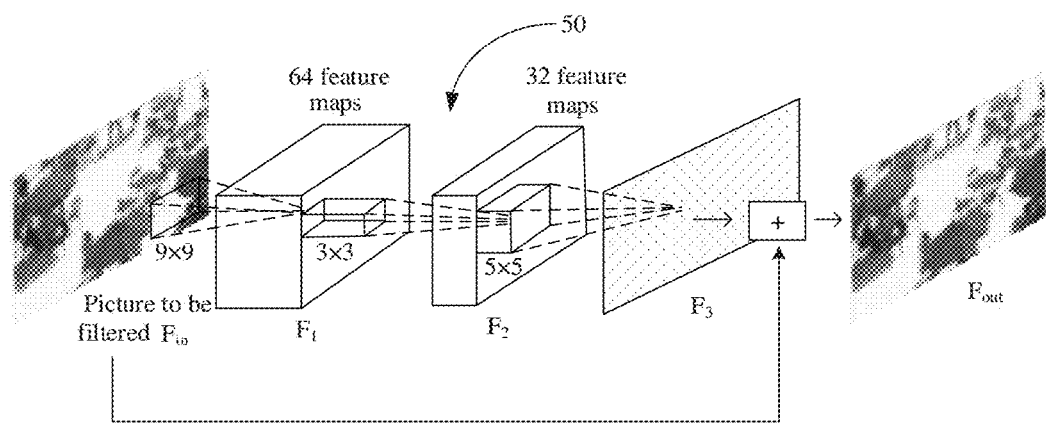
FIG. 5 is a schematic diagram of a structure of a traditional CNN filter provided in an implementation of the present disclosure.

FIG. 5 is a schematic diagram of a structure of a traditional CNN filter provided in an implementation of the present disclosure. As shown in FIG. 5, a traditional CNN filter 50 is improved on a basis of a previous generation video encoding standard H.265/High Efficiency Video Coding (HEVC), and includes a two-layer convolution network structure, which may replace a de-blocking filter and a sample adaptive compensation filter. After a picture to be filtered (denoted by $F_{in}$) is input to an input layer of the traditional CNN filter 50, it passes through a first layer convolution network $F_1$ (assuming that a convolution kernel is 3×3 in size, and contains 64 feature maps) and a second layer convolution network $F_2$ (assuming that a convolution kernel is 5×5 in size, and contains 32 feature maps) to obtain one type of residual information $F_3$; then a sum of the picture to be filtered $F_{in}$ and the residual information $F_3$ is calculated to finally obtain a filtered picture (denoted by $F_{out}$) output by the traditional CNN filter 50. The convolution network structure is also called a residual neural network, which is used to output residual information corresponding to a picture to be filtered. In this traditional CNN filter 50, three colour components of a picture to be filtered are processed independently, but share the same filtering network and related parameters of the filtering network.

Figure 6A:
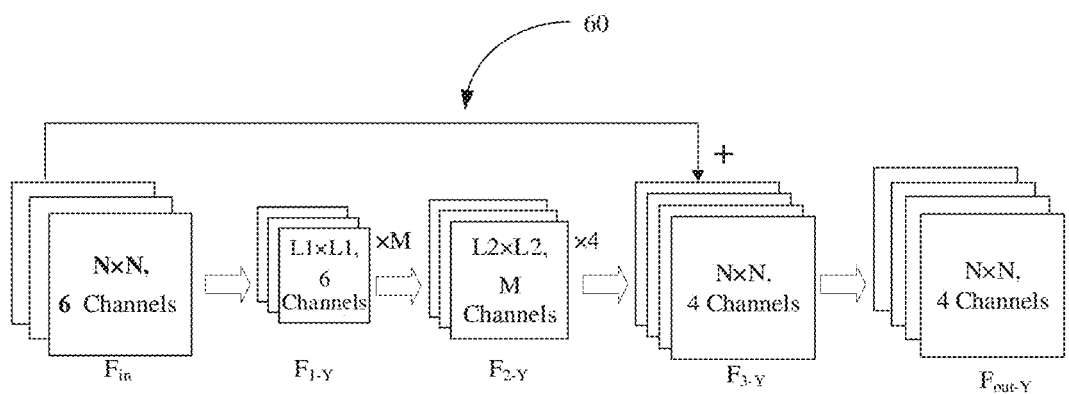
FIG. 6A is a schematic diagram of a structure of another traditional CNN filter provided in an implementation of the present disclosure.
Figure 6B:
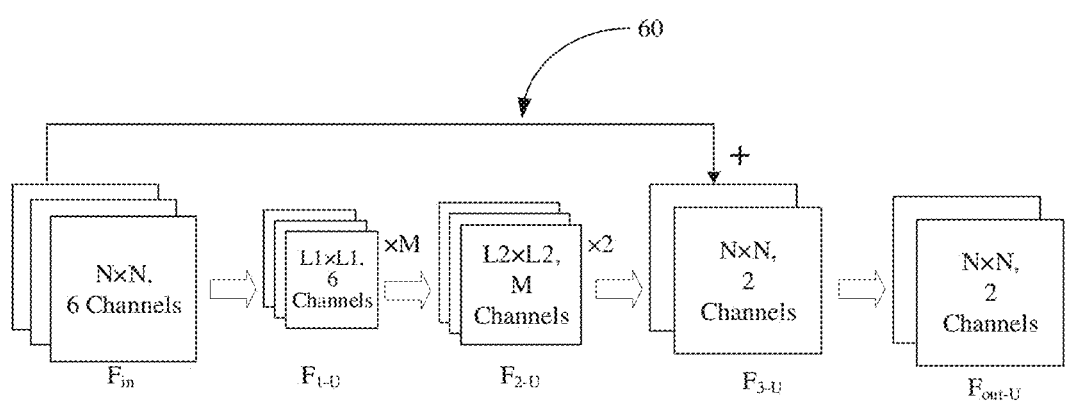
FIG. 6B is a schematic diagram of a structure of still another traditional CNN filter provided in an implementation of the present disclosure.

FIG. 6A is a schematic diagram of a structure of another traditional CNN filter provided in an implementation of the present disclosure, and FIG. 6B is a schematic diagram of a structure of still another traditional CNN filter provided in an implementation of the present disclosure. Referring to FIG. 6A and FIG. 6B, a traditional CNN filter 60 uses two filtering networks. A filtering network shown in FIG. 6A is dedicated to outputting a first colour component, and a filtering network shown in FIG. 6B is dedicated to outputting a second colour component or a third colour component. Assuming that an original picture in a video to be encoded is H in height and W in width, size information corresponding to the first colour component is H×W, and a sample arrangement processing may be performed on the first colour component, which is converted into a form of $$\frac{H}{2} \times \frac{W}{2} \times 4.$$

Since size information corresponding to the second colour component or the third colour component is $$\frac{H}{2} \times \frac{W}{2},$$

the three colour components, after merged, are transformed into a form of $$\frac{H}{2} \times \frac{W}{2} \times 6$$

and input into the traditional CNN filter 60. Based on the filtering network as shown in FIG. 6A, after an input layer network receives a picture to be filtered $F_{in}$ (assuming that a size of a convolution kernel is N×N, and a number of channels is 6), it passes through a first layer convolution network $F_{1-Y}$ (assuming that a size of a convolution kernel is L1×L1, a number of convolution kernels is M, and a number of channels is 6) and a second layer convolution network $F_{2-Y}$ (assuming that a size of a convolution kernel is L2×L2, a number of convolution kernels is 4, and a number of channels is M) to obtain one type of residual information $F_{3-Y}$ (assuming that a size of a convolution kernel is N×N, and a number of channels is 4); then a sum of the picture to be filtered $F_{in}$ and the residual information $F_{3-Y}$ is calculated to finally obtain a filtered first colour component (denoted by $F_{out-Y}$) output by the traditional CNN filter 60. Based on the filtering network as shown in FIG. 6B, after the input layer network receives a picture to be filtered $F_{in}$ (assuming that a size of the convolution kernel is N×N, and a number of channels is 6), it passes through a first layer convolution network $F_{1-U}$ (assuming that a size of a convolution kernel is L1×L1, a number of convolution kernels is M, and a number of channels is 6) and a second layer convolution network $F_{2-U}$ (assuming that a size of a convolution kernel is L2×L2, a number of convolution kernels is 2, and a number of channels is M) to obtain one type of residual information $F_{3-U}$ (assuming that a size of a convolution kernel is N×N, and a number of channels is 4); then a sum of the picture to be filtered $F_{in}$ and the residual information $F_{3-U}$ is calculated to finally obtain a filtered second colour component or a filtered third colour component (denoted by $F_{out-U}$) output by the traditional CNN filter 60.

For the traditional CNN filter 50 shown in FIG. 5 or the traditional CNN filter 60 shown in FIGS. 6A and 6B, it is unreasonable to process each colour component independently since a relationship between different colour components is not considered. In addition, coding parameters such as block partitioning information and QP information are not fully utilized at an input end, but distortion of a reconstructed picture mainly comes from block effect, and boundary information of the block effect is determined by CU partitioning information. That is to say, a filtering network in a CNN filter should focus on boundary regions. In addition, fusing quantization parameter information into a filtering network also helps to improve its generalization ability, so that it can filter a distorted picture of any quality. Therefore, in the filtering method provided in the implementation of the present disclosure, not only the CNN filtering structure is reasonably set such that the same filtering network can receive multiple colour components at the same time, but also a relationship between the multiple colour components is fully considered, and an enhanced picture of these colour components may be output at the same time after a filtering processing. In addition, the filtering method may also assist in filtering by fusing coding parameters such as block partitioning information and/or QP information as coding information, thus improving quality of filtering.

It should be noted that in S3031 in the implementation of the present disclosure, specifically, side information (such as first side information or second side information) corresponding to each component may be determined for a first colour component, a second colour component, and a third colour component of sample information to be filtered respectively, and three colour components may be obtained after a fusing processing; or side information corresponding to each component may be determined for a first colour component and a second colour component of sample information to be filtered respectively, and two colour components may be obtained after a fusing processing; or side information corresponding to each component may be determined for a first colour component and a third colour component of sample information to be filtered, and two components may be obtained after a fusing processing; or even side information corresponding to each component may be determined for a second colour component and a third colour component of sample information to be filtered, and two new components may be obtained after a fusing processing; which is not specifically limited in the implementations of the present disclosure.

It should also be noted that fusing information of sample information to be filtered may be obtained by directly fusing at least two components, or by jointly fusing at least two components and corresponding side information (such as first side information or second side information), which is not specifically limited in the implementations of the present disclosure.

If fusing information is obtained by directly fusing at least two components, it may be that a first colour component, a second colour component, and a third colour component of sample information to be filtered is fused to obtain the fusing information; or it may be that a first colour component and a second colour component of sample information to be filtered is fused to obtain the fusing information; or it may be that a first colour component and a third colour component of sample information to be filtered is fused to obtain the fusing information; or it may even be that a second colour component and a third colour component of sample information to be filtered is fused to obtain the fusing information.

If fusing information is obtained by jointly fusing at least two components and corresponding side information (such as first side information or second side information), it may be that a first colour component, a second colour component, a third colour component of sample information to be filtered and side information is fused to obtain the fusing information; or it may be that a first colour component, a second colour component of sample information to be filtered and side information is fused to obtain the fusing information; or it may be that a first colour component, a third colour component of sample information to be filtered and side information is fused to obtain the fusing information; or it may even be that a second colour component, a third colour component of sample information to be filtered and side information is fused to obtain the fusing information. Specifically, as for "being obtained by jointly fusing at least two components and corresponding side information (such as first side information or second side information)", it may be that at least two components of sample information to be filtered is fused first, and then side information is fused; or it may be that each component of at least two components of sample information to be filtered is respectively fused with corresponding side information, and then at least two processed components are fused; that is to say, a specific way of a fusing processing is not specifically limited in the implementations of the present disclosure.

In addition, in S303 in the implementation of the present disclosure, specifically, after multiple components (such as a first colour component, a second colour component, and a third colour component) of sample information to be filtered and side information (such as first side information or second side information) are fused and input into a filter, it may be that only a first colour component, a second colour component, or a third colour component, after sample information to be filtered is filtered, is output; or it may be that a first colour component and a second colour component, or a second colour component and a third colour component, or a first colour component and a third colour component, after sample information to be filtered is filtered, are output; or it may even be that a first colour component, a second colour component, and a third colour component, after sample information to be filtered is filtered, are output, which is not specifically limited in the implementations of the present disclosure.

Figure 7:
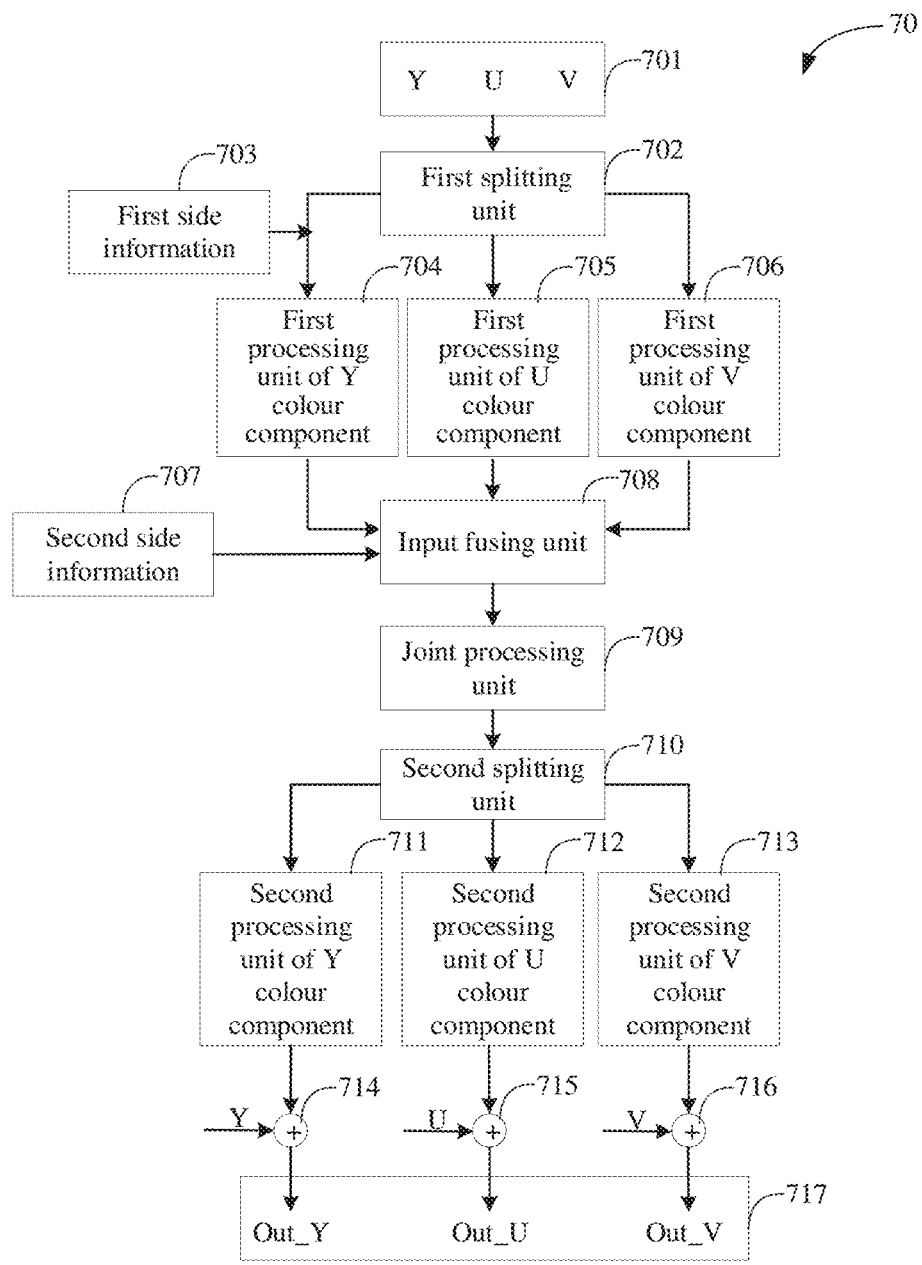
FIG. 7 is a schematic diagram of a structure of an optional filtering framework provided in an implementation of the present disclosure.

Taking three components of sample information to be filtered being input into a neural network-based filter simultaneously and a cascaded processing structure of splitting-merging-splitting being adopted as an example, FIG. 7 is a schematic diagram of a structure of an optional filtering framework provided in an implementation of the present disclosure. As shown in FIG. 7, a filtering framework 70 may include three components (denoted by Y, U, and V respectively) 701 of sample information to be filtered, a first splitting unit 702, first side information 703, a first processing unit of Y colour component 704, a first processing unit of U colour component 705, a first processing unit of V colour component 706, second side information 707, an input fusing unit 708, a joint processing unit 709, a second splitting unit 710, a second processing unit of Y colour component 711, a second processing unit of U colour component 712, a second processing unit of V colour component 713, a first adder 714, a second adder 715, a third adder 716, and three colour components after filtering (denoted by Out_Y, Out_U, and Out_V, respectively) 717. Specifically, after passing through the first splitting unit 702, the three colour components 701 of a picture block to be filtered will be split into signals in three paths: a Y colour component, a U colour component, and a V colour component. The Y colour component in a first path and its corresponding first side information 703 enter the first processing unit of Y colour component 704, the U colour component in a second path and its corresponding first side information 703 enter the first processing unit of U colour component 705, and the V colour component in a third path and its corresponding first side information 703 enter the first processing unit of V colour component 706, thus, three new colour components will be output. The input fusing unit 708 is used to merge the three new colour components with the second side information 707, and then input them into the joint processing unit 709. The joint processing unit 709 includes a multi-layer convolution filtering network for performing convolution calculation on input information. Since a specific convolution calculation process is similar to a related technical scheme, specific execution steps of the joint processing unit 709 will not be repeated herein. After passing through the joint processing unit 709, they will enter the second splitting unit 710 to be split into signals in three paths again, and then the signals in three paths are respectively input into the second processing unit of Y colour component 711, the second processing unit of U colour component 712, and the second processing unit of V colour component 713, so as to obtain residual information of the Y colour component, residual information of the U colour component, and residual information of the V colour component in turn. The Y colour component of the three colour components 701 of the picture block to be filtered and the obtained residual information of the Y colour component are jointly input into the first adder 714, and an output of the first adder 714 is the Y colour component after filtering (denoted by Out_Y); the U colour component of the three colour components 701 of the picture block to be filtered and the obtained residual information of the U colour component are jointly input into the second adder 715, and an output of the second adder 715 is the U colour component after filtering (denoted by Out_U); the V colour component of the three colour components 701 of the picture block to be filtered and the obtained residual information of the V colour component are jointly input into the third adder 716, and an output of the third adder 716 is the V colour component after filtering (denoted by Out_V). Herein, for the output components, if only the Y colour component after filtering needs to be output, the filtering framework 70 may not include the second splitting unit 710, the second adder 715, or the third adder 716; if only the U colour component after filtering needs to be output, the filtering framework 70 may not include the second splitting unit 710, the first adder 714, or the third adder 716; if the Y colour component after filtering and the U colour component after filtering need to be output, the filtering framework 70 may not include the third adder 716, which is not specifically limited in the implementations of the present disclosure.

Figure 8:
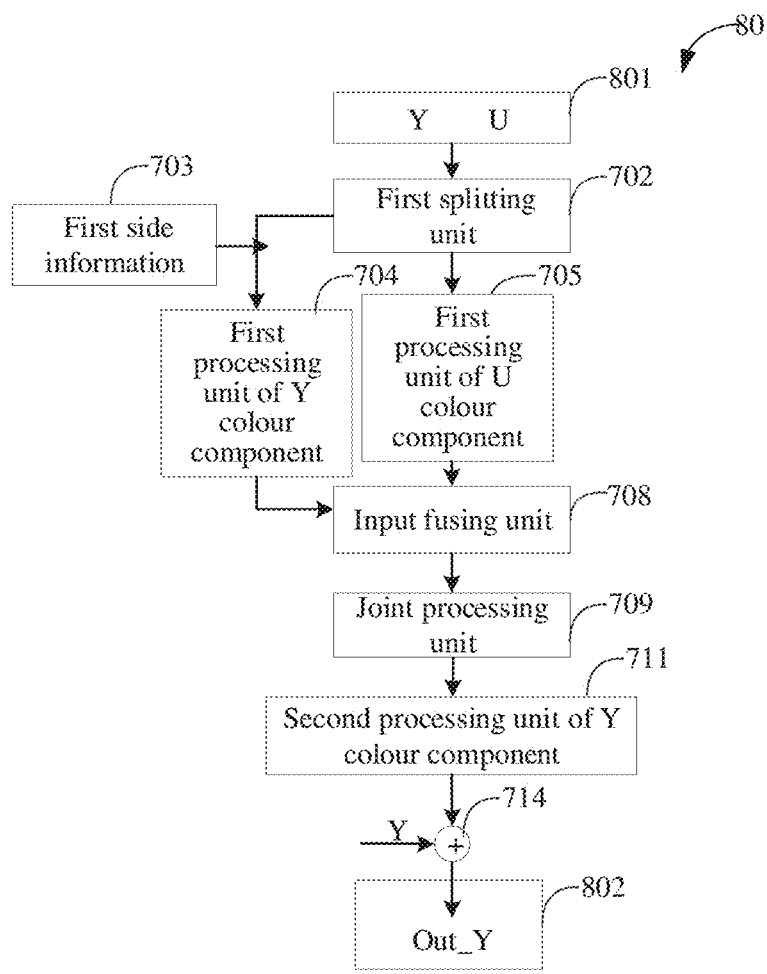
FIG. 8 is a schematic diagram of a structure of another optional filtering framework provided in an implementation of the present disclosure.

Taking two components of sample information to be filtered being input into a neural network-based filter simultaneously and a cascaded processing structure of splitting-fusing being adopted as an example, FIG. 8 is a schematic diagram of a structure of another optional filtering framework provided in an implementation of the present disclosure. As shown in FIG. 8, the filtering framework 80 may include two components (denoted by Y and U respectively) 801 of sample information to be filtered, a first splitting unit 702, first side information 703, a first processing unit of Y colour component 704, a first processing unit of U colour component 705, an input fusing unit 708, a joint processing unit 709, a second processing unit of Y colour component 711, a first adder 714, and a colour component after filtering (denoted by Out_Y) 802. Specifically, after passing through the first splitting unit 702, the two colour components 801 of a picture block to be filtered will be split into signals in two paths: Y colour component and U colour component. The Y colour component in a first path and its corresponding first side information 703 enter the first processing unit of Y colour component 704, and the U colour component in a second path and its corresponding first side information 703 enter the first processing unit of U colour component 705, thus, two new colour components will be output. The input fusing unit 708 is used to fuse the two new colour components, and then input them into the joint processing unit 709. After passing through the joint processing unit 709, since only a single colour component (i.e., a Y colour component after filtering) needs to be output, there is no need to enter the second splitting unit 710 at this time, and it may be directly input to the second processing unit of Y colour component 711, and then residual information of the Y colour component may be obtained. The Y colour component of the two colour components 801 of the picture block to be filtered and the obtained residual information of the Y colour component are jointly input into the first adder 714, an output of the first adder 714 is the Y colour component after filtering (denoted by Out_Y).

It should be noted that, since size information of a Y colour component may be different from that of a U colour component or a V colour component, in the filtering framework 70 shown in FIG. 7 or the filtering framework 80 shown in FIG. 8, an upsampling unit (or a de-convolution unit or a super-resolution unit) may be added before the first processing unit of U colour component 705 and the first processing unit of V colour component 706 for performing an upsampling processing, so that resolution of an upsampled U colour component or an upsampled V colour component remain consistent with resolution of the Y colour component to facilitate subsequent pre-processing filtering and post filtering. In addition, taking the filtering framework 70 shown in FIG. 7 as an example, a pre-processing filter and a post filter in the implementation of the present disclosure may at least include an input fusing unit 708, a joint processing unit 709, and a first adder 714, a second adder 715, and a third adder 716, and may also include a first splitting unit 702, a first processing unit of Y colour component 704, a first processing unit of U colour component 705, a first processing unit of V colour component 706, etc., or may even include a second splitting unit 710, a second processing unit of Y colour component 711, a second processing unit of U colour component 712, and a second processing unit of V colour component 713, which is not specifically limited in the implementation of the present disclosure.

In addition, the filtering method provided in the implementation of the present disclosure may use a splitting-merging-splitting processing structure, such as the filtering framework 70 shown in FIG. 7; or may use a fewer splitting-merging processing structure, such as the filtering framework 80 shown in FIG. 8; or may use a fewer merging-splitting processing structure; or may even use a fewer merging-splitting processing structure or a more splitting-merging-splitting-merging-splitting processing structure, which is not specifically limited in the implementations of the present disclosure.

It should also be noted that both first side information and second side information may be involved in a filtering processing, for example, the filtering framework 70 shown in FIG. 7; or first side information and second side information may be selectively involved in a filtering processing, for example, the filtering framework 80 shown in FIG. 8, wherein the second side information is not involved in a filtering processing. In the implementation of the present disclosure, it may be that both first side information and second side information is involved in a filtering processing, or it may be that first side information is not involved in a filtering processing, or it may be that second side information is not involved in a filtering processing, or it may even be that neither first side information nor second side information is involved in a filtering processing, which is not specifically limited in the implementations of the present disclosure.

It should also be noted that a fusing stage of first side information and that of second side information may be the same or different. That is to say, first side information and second side information may be involved in a filtering processing at the same stage, or may be involved in a filtering process at different stages, which is not specifically limited in the implementations of the present disclosure. For example, still taking the filtering framework 70 shown in FIG. 7 as an example, both the first side information 703 and the second side information 707 may be involved in a filtering processing in a stage corresponding to the first splitting unit 702, or both the first side information 703 and the second side information 707 may be involved in a filtering processing in a stage corresponding to the input fusing unit 708, or both the first side information 703 and the second side information 707 may be involved in a filtering processing in a stage corresponding to the second splitting unit 710; or the first side information 703 is involved in a filtering processing in a stage corresponding to the first splitting unit 702, and the second side information 707 is involved in a filtering processing in a stage corresponding to the input fusing unit 708; or the first side information 703 is involved in a filtering processing before a stage corresponding to the first splitting unit 702, and the second side information 707 is involved in a filtering processing in a stage corresponding to the input fusing unit 708; or the first side information 703 is involved in a filtering processing before a stage corresponding to the first splitting unit 702, and the second side information 707 is involved in a filtering processing in a stage corresponding to the second splitting unit 710; or the first side information 703 is involved in a filtering processing in a stage corresponding to the input fusing unit 708, and the second side information 707 is involved in a filtering processing in a stage corresponding to the second splitting unit 710. That is to say, a fusing stage may be flexibly selected for the first side information 703 or the second side information 707 in a cascaded processing structure, which is not specifically limited in the implementations of the present disclosure.

Taking the filtering framework 70 shown in FIG. 7 as an example, a deep learning network (such as CNN) is adopted for filtering. Comparing with a traditional CNN filter, a filter provided in the implementation of the present disclosure uses a cascaded processing structure, three components of sample information to be filtered may be input into a filtering network at the same time, and other coding-related side information (e.g., coding parameters such as block partitioning information, quantization parameter information, and MV information) is fused, and the side information may be fused into the filtering network at the same stage or at different stages. Thus, not only a relationship among the three components is fully utilized, but also other coding-related coding information is used to assist in filtering, to improve quality of filtering. In addition, the three components are processed at the same time, such that a problem that three complete network forward calculations need to be performed on three components is avoided effectively, thereby reducing computational complexity and saving code rate of encoding.

Figure 9:
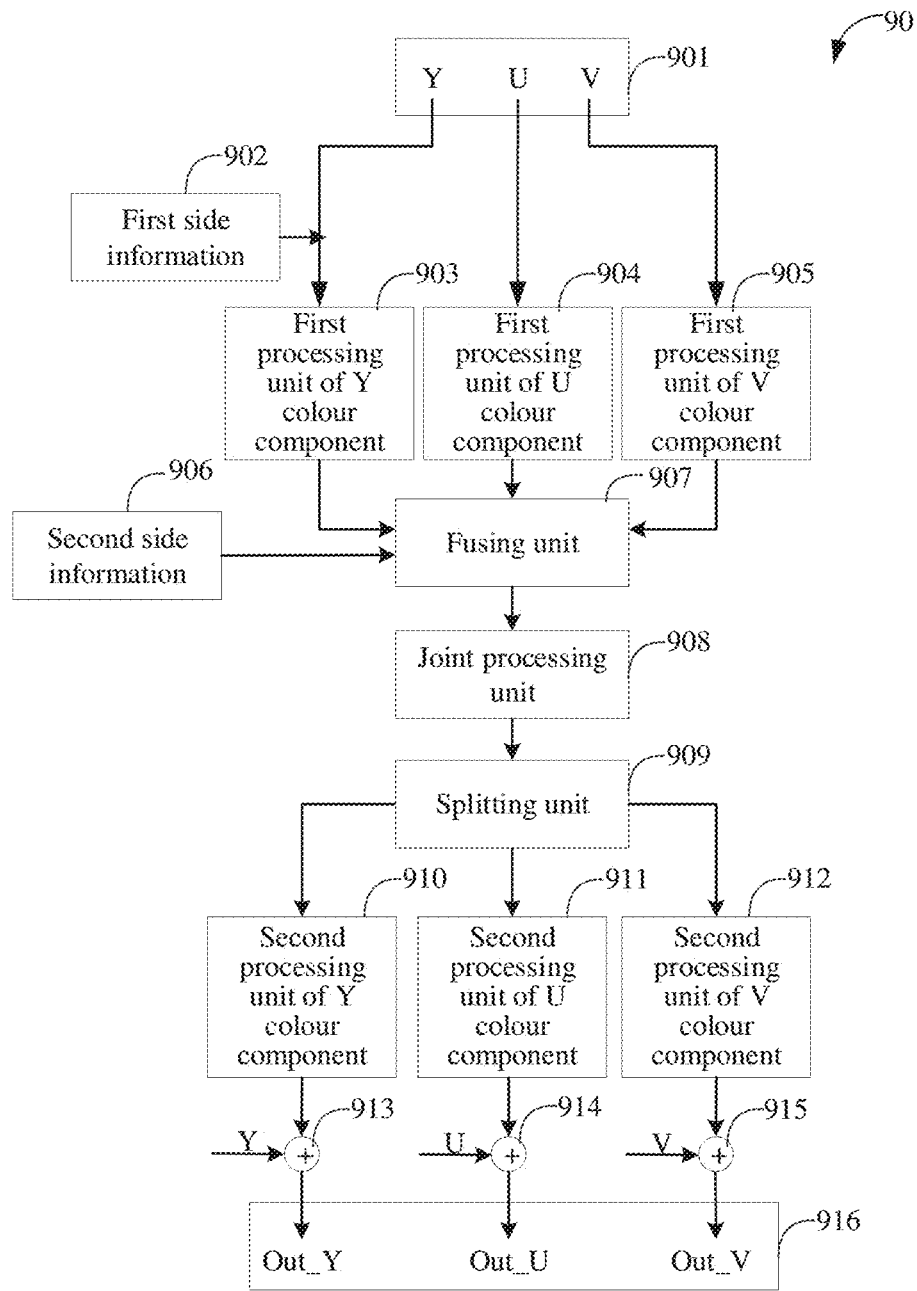
FIG. 9 is a schematic diagram of a structure of still another optional filtering framework provided in an implementation of the present disclosure.

FIG. 9 is a schematic diagram of a structure of still another optional filtering framework provided in an implementation of the present disclosure. As shown in FIG. 9, a filtering framework 90 may include three components (denoted by Y, U, and V respectively) 901 of sample information to be filtered, first side information 902, a first processing unit of Y colour component 903, a first processing unit of U colour component 904, a first processing unit of V colour component 905, second side information 906, a fusing unit 907, a joint processing unit 908, a splitting unit 909, a second processing unit of Y colour component 910, a second processing unit of U colour component 911, a second processing unit of V colour component 912, a first adder 913, a second adder 914, a third adder 915, and three colour components after filtering (denoted by Out_Y, Out_U, and Out_V, respectively) 916. Specifically, after component processing, the three colour components 901 of the sample information to be filtered will be split into signals in three paths: a Y colour component, a U colour component, and a V colour component. The Y colour component in a first path and its corresponding first side information 902 enter the first processing unit of Y colour component 903, the U colour component in a second path and its corresponding first side information 902 enter the first processing unit of U colour component 904, and the V colour component in a third path and its corresponding first side information 902 enter the first processing unit of V colour component 905, thus, three new colour components will be output. The fusing unit 907 is used to fuse the three new colour components with the second side information 906, and then input them into the joint processing unit 908. The joint processing unit 908 includes a multi-layer convolution filtering network for performing convolution calculation on input information. Since a specific convolution calculation process is similar to a related technical scheme, specific execution steps of the joint processing unit 908 will not be repeated herein. After passing through the joint processing unit 908, they will enter the splitting unit 909 to be split into signals in three paths again, and then the signals in three paths are respectively input into the second processing unit of Y colour component 910, the second processing unit of U colour component 911 and the second processing unit of V colour component 912, so as to obtain residual information of the Y colour component, residual information of the U colour component, and residual information of the V colour component in turn. The Y colour component of the three colour components 901 of the sample information to be filtered and the obtained residual information of the Y colour component are jointly input into the first adder 913, an output of first adder 913 is a Y colour component after filtering (denoted by Out_Y); the U colour component of the three colour components 901 of the sample information to be filtered and the obtained residual information of the U colour component are jointly input into the second adder 914, an output of the second adder 914 is a U colour component after filtering (denoted by Out_U); the V colour component of the three colour components 901 of the sample information to be filtered and the obtained residual information of the V colour component are jointly input into the third adder 915, an output of the third adder 915 is a V colour component after filtering (denoted by Out_V). Herein, for the output components, if only the Y colour component after filtering needs to be output, the filtering framework 90 may not include the splitting unit 909, the second adder 915, or the third adder 915; if only the U colour component after filtering needs to be output, the filtering framework 90 may not include the splitting unit 909, the first adder 913, or the third adder 915; if the Y colour component after filtering and the U colour component after filtering need to be output, the filtering framework 90 may not include the third adder 915, which is not specifically limited in the implementations of the present disclosure.

The neural network architecture provided by the implementation of the present disclosure can reasonably and effectively utilize each component and side information, and can bring better encoding performance.

The implementation of the present disclosure provides a filtering method. Firstly, in a filtering method, sample information to be filtered is obtained, at least one type of side information is obtained, and at least two components of the sample information to be filtered and the at least one type of side information are input into a neural network-based filter to output and obtain at least one component after the sample information to be filtered is filtered. That is to say, in the implementation of the present disclosure, at least two components in sample information to be filtered and at least one type of side information are obtained, and are input into a neural network-based filter for processing, and side information of at least one component is fused into a filtering process to obtain filtered sample information. Thus, not only a relationship between multiple components is fully utilized, but also a problem that multiple complete network forward calculations need to be performed on at least two components is avoided effectively. Furthermore, computational complexity is reduced, code rate of encoding is saved, and quality of a picture obtained after pre-processing filtering and quality of a picture obtained after post filtering in an encoding and decoding process is improved, thereby improving quality of a reconstructed picture.

Figure 10:
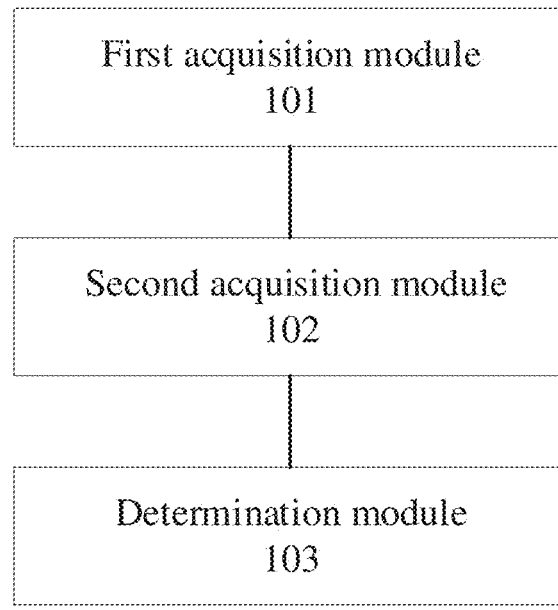
FIG. 10 is a schematic diagram of a structure of an optional filtering device provided in an implementation of the present disclosure.

Based on the same inventive concept, FIG. 10 is a schematic diagram of a structure of an optional filtering device provided in an implementation of the present disclosure. As shown in FIG. 10, a filtering device may include a first acquisition module 101, a second acquisition module 102, and a determination module 103.

The first acquisition module 101 is configured to acquire sample information to be filtered.

The second acquisition module 102 is configured to acquire at least one type of side information.

The determination module 103 is configured to input at least two components of the sample information to be filtered and the at least one type of side information into a neural network-based filter to output and obtain at least one component after the sample information to be filtered is filtered.

In the above scheme, the determination module 103 may include: a first processing submodule configured to process each component of the at least two components respectively to obtain at least two processed components; a fusing submodule configured to perform a fusing processing according to the at least one type of side information and the at least two processed components to obtain fusing information of the sample information to be filtered; and a second processing submodule configured to process the fusing information to obtain at least one component after the sample information to be filtered is filtered.

In the above scheme, the first processing submodule may be specifically configured to: preform a component processing on each component of the at least two components respectively to obtain at least two processed components.

In the above scheme, when first side information corresponding to each component is acquired, accordingly, the first processing submodule may be specifically configured to: perform a fusing processing respectively on each component of the at least two components an first side information corresponding to each component to obtain at least two processed components; wherein the first side information at least includes block partitioning information and/or quantization parameter information.

In the above scheme, the fusing submodule may be specifically configured to: perform a fusing processing on the at least two processed components and first side information corresponding to each component to obtain fusing information of the sample information to be filtered.

In the above scheme, the second processing submodule may be specifically configured to:

perform a joint processing and a splitting processing on the fusing information to obtain residual information corresponding to at least one component of the at least two components; and calculate a sum of the at least one component of the at least two components and the residual information corresponding to the at least one component to obtain at least one component after the sample information to be filtered is filtered.

In the above scheme, when second side information corresponding to each component is acquired, accordingly, the first processing submodule may be specifically configured to: perform a fusing processing respectively on each component of the at least two components and the second side information corresponding to each component to obtain the at least two processed components; wherein the second side information is different from the first side information.

In the above scheme, the fusing submodule may be specifically configured to: perform a fusing processing on the at least two processed components and the second side information corresponding to each component to obtain fusing information of the sample information to be filtered.

In the above scheme, a structure of a neural network includes at least one joint processing stage and one separate processing stage. In the joint processing stage, all components are processed jointly. In the separate processing stage, each component is processed on a separate branch of the neural network.

It may be understood that, in the implementations, a "unit" may be a portion of a circuit, a portion of a processor, a portion of a program, or software, etc.; it, of course, may be a module, or may be non-modular. In addition, various components in the implementations may be integrated into one processing unit, or various units may exist physically respectively, or two or more than two units may be integrated into one unit. The integrated units may be implemented in a form of hardware, or may be implemented in a form of a software functional module.

The integrated unit, if implemented in the form of a software functional module and sold or used as an independent product, may be stored in a computer-readable storage medium. Based on such understanding, a technical scheme of the present disclosure, in essence, or a part contributing to the prior art, or all or part of a technical scheme, may be embodied in a form of a software product, which is stored in a storage medium, and includes several instructions for enabling a computer device (which may be a personal computer, a server, or a network device, etc.) or a processor to perform all or part of steps of the method in the implementations. The aforementioned storage medium includes various medium capable of storing program codes, such as a U disk, a mobile hard disk, a Read-Only Memory (ROM), a Random Access Memory (RAM), a magnetic disk, or an optical disk.

Figure 11:
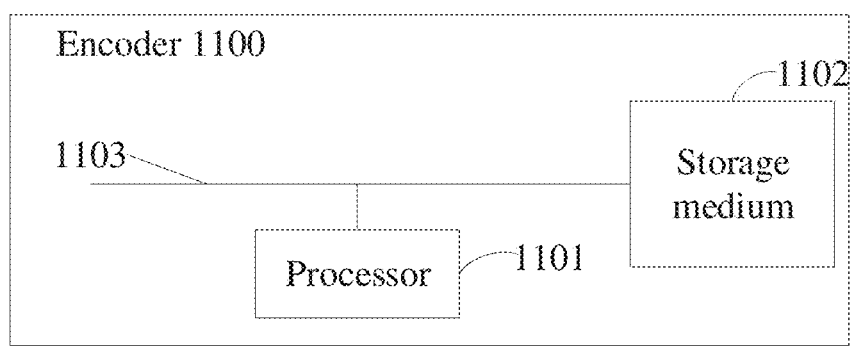
FIG. 11 is a schematic diagram of a structure of an optional encoder provided in an implementation of the present disclosure.

FIG. 11 is a schematic diagram of a structure of an optional encoder provided in an implementation of the present disclosure. As shown in FIG. 11, the implementation of the present disclosure provides an encoder 1100.

The encoder 1100 includes a processor 1101 and a storage medium 1102 storing instructions executable by the processor 1101, the storage medium 1102 relies on the processor 1101 to perform an operation through communication buses 1103, and when the instructions are executed by the processor 1101, the filtering method provided in one or more implementations described above is performed.

It should be noted that in practical applications, various components in a terminal are coupled together through communication buses 1103. It may be understood that the communication buses 1103 are used for implementing connections and communications between these components. In addition to data buses, the communication buses 1103 further includes power buses, control buses, and status signal buses. However, for the sake of clear, various buses are labeled as the communication buses 1103 in FIG. 11.

An implementation of the present disclosure provides a computer storage medium storing executable instructions, which, when executed by one or more processors, the filtering method provided in one or more implementations described above is performed.

It may be understood that a memory in the implementations of the present disclosure may be a volatile memory or a non-volatile memory, or may include both a volatile memory and a non-volatile memory. The non-volatile memory may be a Read-Only Memory (ROM), a Programmable ROM (PROM), an Erasable PROM (EPROM), an Electrically EPROM (EEPROM), or a flash memory. A volatile memory may be a Random Access Memory (RAM), which is used as an external cache. Through exemplary but non-restrictive description, many forms of RAMs may be available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). The memory in the systems and methods described herein is intended to include, but not be limited to, these and any other suitable types of memories.

The processor may be an integrated circuit chip having a signal processing capability. In an implementation process, each of the steps of the methods described above may be completed through an integrated logic circuit of hardware in the processor or instructions in a form of software. The processor described above may be a general purpose processor, a Digital Signal Processor (DSP), an Application Specific Integrated Circuit (ASIC), a Field Programmable Gate Array (FPGA) or another programmable logic device, a discrete gate, or a transistor logic device, or a discrete hardware component. The processor may implement or perform various methods, steps, and logical block diagrams disclosed in the implementations of the present disclosure. The general purpose processor may be a microprocessor, or the processor may be any conventional processor, or the like. The steps of the methods disclosed in the implementations of the present disclosure may be directly embodied to be completed by a hardware decoding processor, or may be completed by a combination of hardware and software modules in a decoding processor. The software modules may be located in a storage medium which is mature in the art, such as a Random Access Memory, a flash memory, a Read-Only Memory, a Programmable Read-Only Memory, an Electrically Erasable Programmable Memory, or a register. The storage medium is located in a memory, and a processor reads information in the memory and completes the steps of the foregoing methods in combination with its hardware.

It may be understood that the implementations described herein may be implemented by hardware, software, firmware, middleware, microcode, or a combination thereof. For the implementation by hardware, a processing unit may be implemented in one or more Application Specific Integrated Circuits (ASICs), Digital Signal Processors (DSPs), DSP Devices (DSPDs), Programmable Logic Devices (PLDs), Field-Programmable Gate Arrays (FPGAs), general purpose processors, controllers, microcontrollers, microprocessors, other electronic modules for performing functions described in the present disclosure, or combinations thereof.

For the implementation by software, techniques described herein may be implemented by modules (e.g., processes, functions, etc.) that perform the functions described herein. Software codes may be stored in a memory and executed by a processor. The memory may be implemented in the processor or external to the processor.

It should be noted that in the present disclosure, the terms "include", "contain" or any other variations thereof are intended to cover a non-exclusive inclusion, such that a process, method, article, or device that includes a list of elements includes not only those elements but also other elements not expressly listed, or further includes elements inherent to such process, method, article, or device. An element defined by a statement "include one" does not exclude presence of additional identical elements in the process, method, article, or device that includes the element, without more limitations.

The above-mentioned serial numbers of the implementations of the present disclosure are only for description, and do not represent superiority and inferiority of the implementations.

Through the description of the above implementations, those skilled in the art may clearly understand that the methods provided in the above implementations may be implemented by means of software plus necessary general hardware platform, and of course they may be implemented by hardware, but the former are better implementations in many cases. Based on such understanding, the technical schemes of the implementations of the present disclosure, in essence, or the part contributing to the prior art, may be embodied in a form of a software product stored in a storage medium (such as a ROM/RAM, a magnetic disk, or an optical disk), including several instructions for enabling a terminal (which may be a mobile phone, a computer, a server, or a network device) to perform the methods described in various implementations of the present disclosure.

The implementations of the present disclosure have been described above in conjunction with the accompanying drawings, but the present disclosure is not limited to the above specific implementations, which are only illustrative and not restrictive. Under enlightenment of the present disclosure, those of ordinary skill in the art may make many forms without departing from the purpose of the present disclosure and the protection scope of the claims, which are within the protection scope of the present disclosure.

INDUSTRIAL APPLICABILITY

In the implementations of the present disclosure, firstly, a filtering device acquires sample information to be filtered, acquires at least one type of side information, and inputs at least two components of the sample information to be filtered and the at least one type of side information into a neural network-based filter to output and obtain at least one component after the sample information to be filtered is filtered. That is to say, in the implementations of the present disclosure, at least two components in the sample information to be filtered and at least one type of side information are acquired, and they are input into a neural network-based filter for processing, and side information of at least one component is fused in a filtering process to obtain sample information after filtering. Thus, not only a relationship between multiple components is fully utilized, but also a problem that multiple complete network forward calculations need to be performed on at least two components is avoided effectively. Furthermore, computational complexity is reduced, code rate of encoding is saved, and quality of a picture obtained after pre-processing filtering and quality of a picture obtained after post filtering in an encoding and decoding process is improved, thereby improving quality of a reconstructed picture.

What we claim is:

1. A filtering method, applied to an encoder, comprising:
   acquiring sample information to be filtered;
   acquiring at least one type of side information; and
   inputting at least two colour component values of the sample information to be filtered and the at least one type of side information into a neural network based filter to output and obtain at least one colour component value after the sample information to be filtered is filtered;
   wherein the method is applied to a post filtering module of the encoder, the method further comprises:
   acquiring an input picture;
   performing an encoding processing on the input picture to obtain a picture after being loop filtered;
   taking samples contained in the picture after being loop filtered as the sample information to be filtered;
   performing the filtering method to obtain at least one colour component value after the sample information to be filtered is filtered;
   encoding at least one colour component value after the sample information to be filtered is filtered to generate a bitstream;
   wherein inputting the at least two colour component values of the sample information to be filtered and the at least one type of side information into the neural network based filter to output and obtain the at least one colour component value after the sample information to be filtered is filtered, comprises:
   processing each colour component value of the at least two colour component values respectively to obtain at least two processed colour component values;
   fusing the at least one type of side information and the at least two processed colour component values to obtain at least two fusing processed colour component values of the sample information to be filtered; and
   processing the at least two fusing processed colour component values to obtain the at least one colour component value after the sample information to be filtered is filtered.

2. The method according to claim 1, wherein when first side information corresponding to each colour component value is acquired, accordingly, processing each colour component value of the at least two colour component values respectively to obtain the at least two processed colour component values, comprises:
   fusing each colour component value of the at least two colour component values and the first side information corresponding to each colour component value respectively to obtain the at least two processed colour component values; wherein the first side information at least comprises block partitioning information and/or quantization parameter information;
   wherein fusing the at least one type of side information and the at least two processed colour component values to obtain the at least two fusing processed colour component values of the sample information to be filtered, comprises:
   fusing the at least two processed colour component values and first side information corresponding to each colour component value to obtain the at least two fusing processed colour component values of the sample information to be filtered.

3. The method according to claim 1, wherein processing the at least two fusing processed colour component values to obtain the at least one colour component value after the sample information to be filtered is filtered, comprises:
   performing a joint processing and a splitting processing on the at least two fusing processed colour component values to obtain residual information corresponding to at least one colour component value of the at least two colour component values; and
   calculating a sum of the at least one colour component value of the at least two colour component values and the residual information corresponding to the at least one colour component value to obtain the at least one colour component value after the sample information to be filtered is filtered.

4. The method according to claim 1, wherein when second side information corresponding to each colour component value is acquired, accordingly, processing each colour component value of the at least two colour component values respectively to obtain the at least two processed colour component values, comprises:
fusing each colour component value of the at least two colour component values and second side information corresponding to each colour component value respectively to obtain the at least two processed colour component values; wherein the second side information is different from first side information;
wherein fusing the at least one type of side information and the at least two processed colour component values to obtain the at least two fusing processed colour component values of the sample information to be filtered, comprises:
fusing the at least two processed colour component values and second side information corresponding to each colour component value to obtain the at least two fusing processed colour component values of the sample information to be filtered.

5. A filtering method, applied to a decoder, comprising:
acquiring sample information to be filtered;
acquiring at least one type of side information; and
inputting at least two colour component values of the sample information to be filtered and the at least one type of side information into a neural network based filter to output and obtain at least one colour component value after the sample information to be filtered is filtered;
wherein the method is applied to a post filtering module of the decoder, the method further comprises:
parsing a bitstream to obtain a picture after being loop filtered;
taking samples contained in the picture after being loop filtered as the sample information to be filtered;
performing the filtering method to obtain at least one colour component value after the sample information to be filtered is filtered;
reconstructing a picture according to at least one colour component value after the sample information to be filtered is filtered;
wherein inputting the at least two colour component values of the sample information to be filtered and the at least one type of side information into the neural network based filter to output and obtain the at least one colour component value after the sample information to be filtered is filtered, comprises:
processing each colour component value of the at least two colour component values respectively to obtain at least two processed colour component values;
fusing the at least one type of side information and the at least two processed colour component values to obtain at least two fusing processed colour component values of the sample information to be filtered; and
processing the at least two fusing processed colour component values to obtain the at least one colour component value after the sample information to be filtered is filtered.

6. The method according to claim 5, wherein when first side information corresponding to each colour component value is acquired, accordingly, processing each colour component value of the at least two colour component values respectively to obtain the at least two processed colour component values, comprises:
fusing each colour component value of the at least two colour component values and the first side information corresponding to each colour component value respectively to obtain the at least two processed colour component values; wherein the first side information at least comprises block partitioning information and/or quantization parameter information;
wherein fusing the at least one type of side information and the at least two processed colour component values to obtain the at least two fusing processed colour component values of the sample information to be filtered, comprises:
fusing the at least two processed colour component values and first side information corresponding to each colour component value to obtain the at least two fusing processed colour component values of the sample information to be filtered.

7. The method according to claim 5, wherein processing the at least two fusing processed colour component values to obtain the at least one colour component value after the sample information to be filtered is filtered, comprises:
performing a joint processing and a splitting processing on the at least two fusing processed colour component values to obtain residual information corresponding to at least one colour component value of the at least two colour component values;
calculating a sum of the at least one colour component value of the at least two colour component values and the residual information corresponding to the at least one colour component value to obtain the at least one colour component value after the sample information to be filtered is filtered.

8. The method according to claim 5, wherein when second side information corresponding to each colour component value is acquired, accordingly, processing each colour component value of the at least two colour component values respectively to obtain the at least two processed colour component values, comprises:
fusing each colour component value of the at least two colour component values and second side information corresponding to each colour component value respectively to obtain the at least two processed colour component values; wherein the second side information is different from first side information;
wherein fusing the at least one type of side information and the at least two processed colour component values to obtain the at least two fusing processed colour component values of the sample information to be filtered, comprises:
fusing the at least two processed colour component values and second side information corresponding to each colour component value to obtain the at least two fusing processed colour component values of the sample information to be filtered.

9. An encoder, comprising a processor and a memory, wherein the memory is configured to store a computer program, and the processor is configured to call and run the computer program stored in the memory to control the encoder to:
acquire sample information to be filtered;
acquire at least one type of side information;
input at least two colour component values of the sample information to be filtered and the at least one type of side information into a neural network based filter to output and obtain at least one colour component value after the sample information to be filtered is filtered;

wherein the processor is further configured to call and run the computer program stored in the memory to control the encoder to:

acquire an input picture;

perform an encoding processing on the input picture to obtain a picture after being loop filtered;

take samples contained in the picture after being loop filtered as the sample information to be filtered;

input at least two colour component values of the sample information to be filtered and the at least one type of side information into a neural network based filter to output and obtain at least one colour component value after the sample information to be filtered is filtered;

encode at least one colour component value after the sample information to be filtered is filtered to generate a bitstream;

wherein the processor is configured to call and run the computer program stored in the memory to control the encoder to:

process each colour component value of the at least two colour component values respectively to obtain at least two processed colour component values;

fuse the at least one type of side information and the at least two processed colour component values to obtain at least two fusing processed colour component values of the sample information to be filtered; and process the at least two fusing processed colour component values to obtain the at least one colour component value after the sample information to be filtered is filtered.

10. A decoder, comprising a processor and a memory, wherein the memory is configured to store a computer program, and the processor is configured to call and run the computer program stored in the memory to control the decoder to:

acquire sample information to be filtered;

acquire at least one type of side information;

input at least two colour component values of the sample information to be filtered and the at least one type of side information into a neural network based filter to output and obtain at least one colour component value after the sample information to be filtered is filtered;

wherein the processor is further configured to call and run the computer program stored in the memory to control the encoder to:

parse a bitstream to obtain a picture after being loop filtered;

take samples contained in the picture after being loop filtered as the sample information to be filtered;

input at least two colour component values of the sample information to be filtered and the at least one type of side information into a neural network based filter to output and obtain at least one colour component value after the sample information to be filtered is filtered;

reconstruct a picture according to at least one colour component value after the sample information to be filtered is filtered;

wherein the processor is configured to call and run the computer program stored in the memory to control the decoder to:

process each colour component value of the at least two colour component values respectively to obtain at least two processed colour component values;

fuse the at least one type of side information and the at least two processed colour component values to obtain at least two fusing processed colour component values of the sample information to be filtered; and process the at least two fusing processed colour component values to obtain the at least one colour component value after the sample information to be filtered is filtered.

* * * * *